INVENTOR.
Irving M. Stein
BY Cornelius D. Ehret
his ATTORNEY.

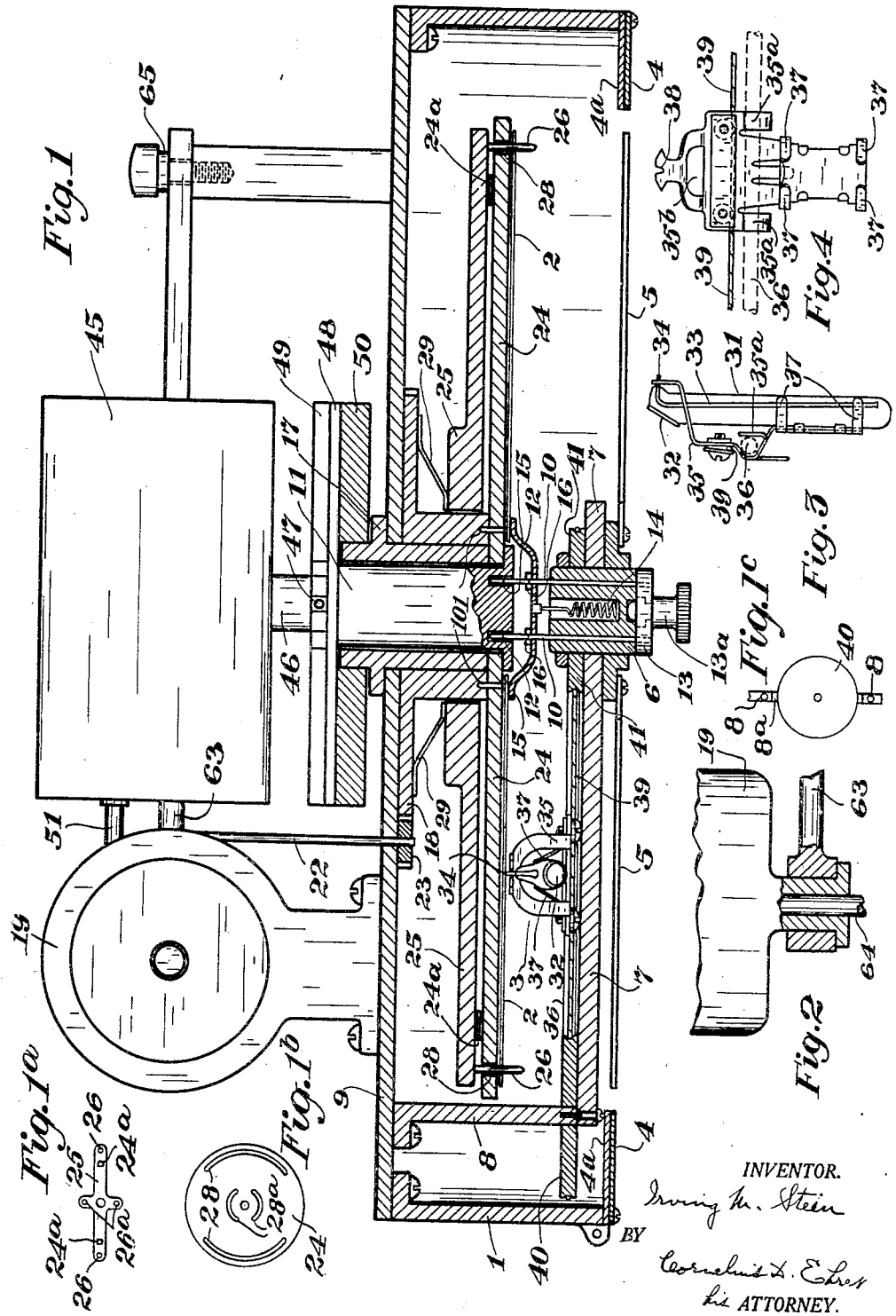

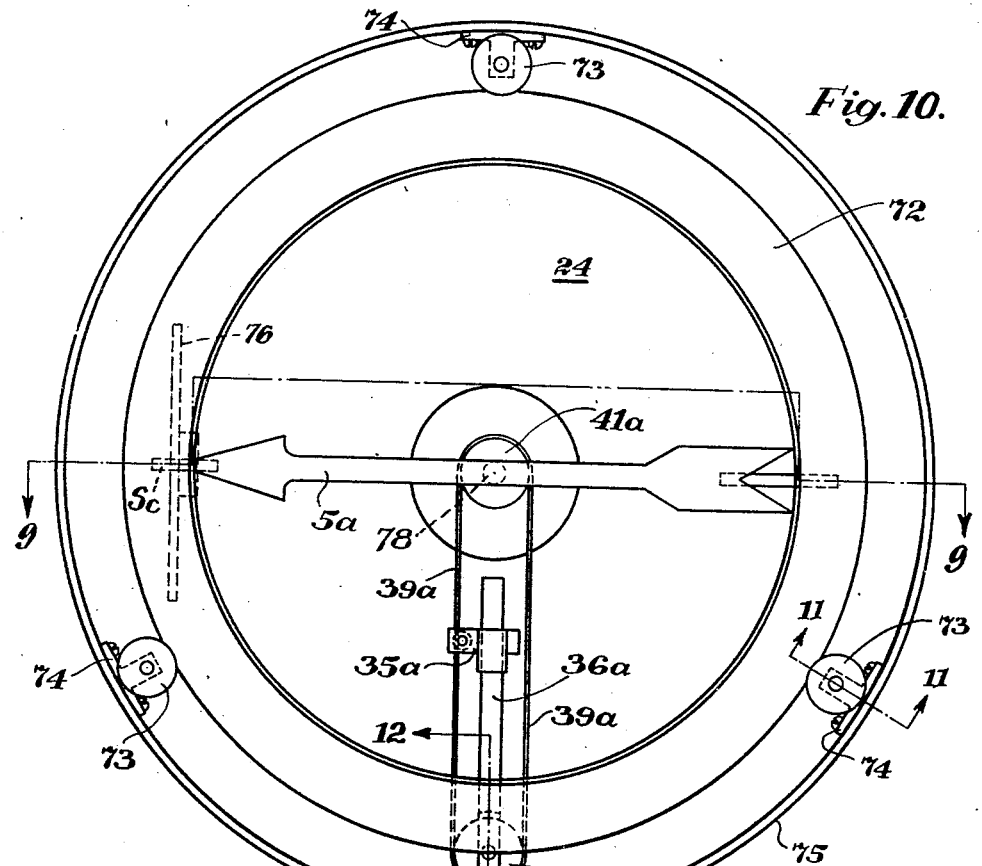
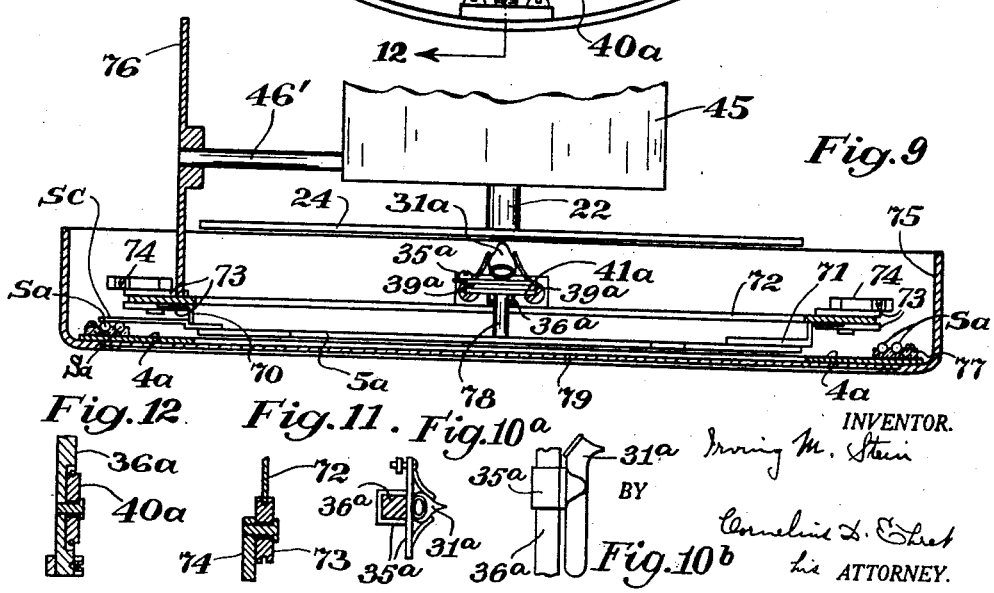

March 16, 1937.  I. M. STEIN  2,074,116
EXHIBITING INSTRUMENT
Filed Oct. 9, 1933  4 Sheets-Sheet 4
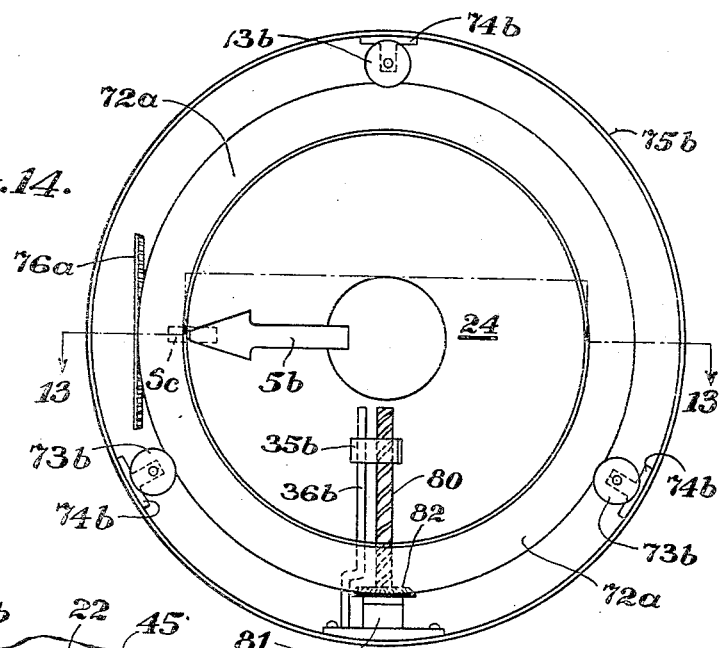
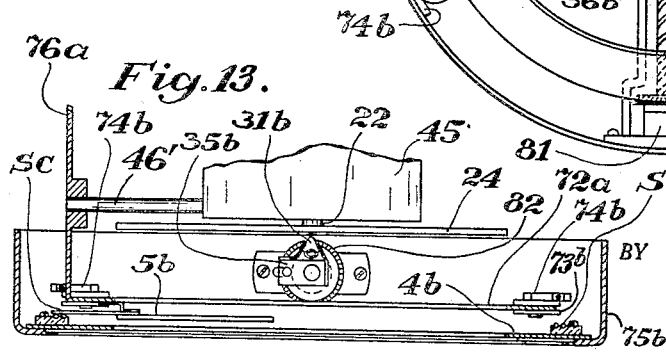
INVENTOR.
Irving M. Stein
BY
Cornelius D. Ehret
his ATTORNEY.

Patented Mar. 16, 1937

2,074,116

UNITED STATES PATENT OFFICE 2,074,116

EXHIBITING INSTRUMENT

Irving M. Stein, Philadelphia, Pa., assignor to Leeds & Northrup Company, Philadelphia, Pa., a corporation of Pennsylvania Application October 9, 1933, Serial No. 692,803

15 Claims. (Cl. 234—70)

My invention relates to exhibiting instruments, such as apparatus for indicating and recording the magnitude or changes in magnitude of a condition, as pressure, temperature, ion concentration, or other physical, chemical or electrical condition.

One object of my invention is to provide an instrument in which the record is made on a circular chart and which is provided with an annular scale of large diameter with which cooperates a bold moving index for readability at considerable distance from the instrument.

Further in accordance with my invention, the graduations of the scale are formed by radial notches punched from its inner periphery and, more specifically, to the back of the scale may be attached a plate of contrasting color visible through the notches for enhanced readability at a distance.

More particularly, the drive for the index and recorder pen, or equivalent, includes a disengageable connection to allow replacement of the chart; and the chart drive includes a disengageable connection facilitating setting of the time scale of the chart to proper position.

My invention also resides in the features of construction, combination and arrangement hereinafter described and claimed.

Reference is to be had to the accompanying drawings in which:

Figure 1 is a top plan view, partly in section, of an indicator-recorder embodying the invention;

Figs. 1a and 1b are detail views of parts shown in Fig. 1;

Fig. 1c is a detail view in elevation of parts shown in Fig. 1;

Fig. 2 is a detail view of parts shown in Fig. 1;

Figs. 3 and 4 are side and front elevational views, respectively, of the recorder pen carriage;

Figure 6:
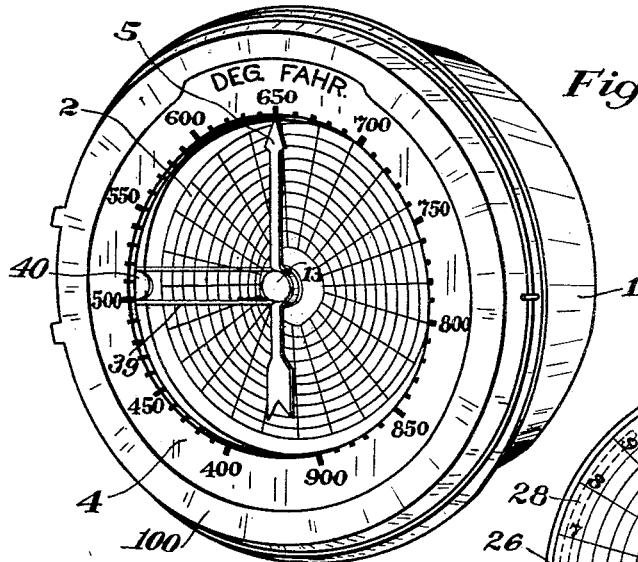
Figure 7:
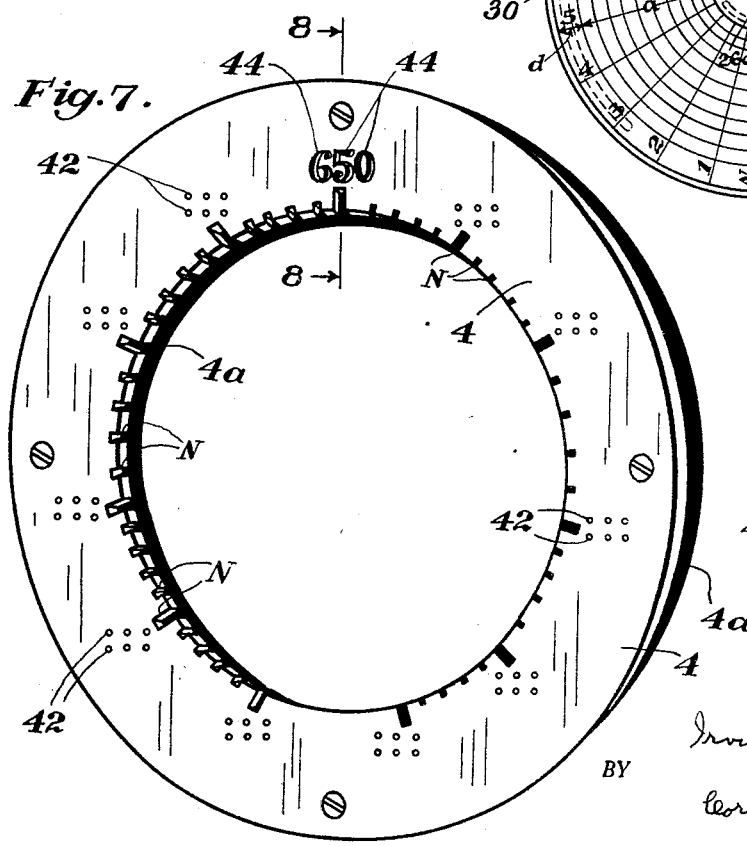
Figure 8:
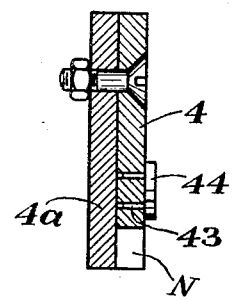

Fig. 6, on reduced scale, is a perspective view of the indicator-recorder with the pen and pen-supporting arm omitted;

Fig. 7, on an enlarged scale and in perspective, shows the indicator dial;

Fig. 8 is a sectional view taken on line 8—8 of Fig. 7;

Fig. 9 is a plan view in section of a modified arrangement taken on line 9—9 of Fig. 10;

Fig. 10 is a front elevational view of parts shown in Fig. 9 and with parts omitted;

Figs. 10a and 10b are detail views in plan and side elevation of parts shown in Figs. 9 and 10;

Fig. 11 is a detail view taken on line 11—11 of Fig. 10;

Fig. 12 is a detail view taken on line 12—12 of Fig. 10;

Fig. 13 is a sectional plan view of another modification taken on line 13—13 of Fig. 14;

Fig. 14 is a front elevational view of parts shown in Fig. 13 and with parts omitted.

Referring to Figs. 1 and 6, from the front of the housing 1 of the exhibiting instrument is visible a markable element shown as a circular recorder sheet or chart 2 on which a record is traced by a marker such as the pen 3 or equivalent, and the large annular scale 4 with which cooperates the pointer 5, the entire length of which, extending across the front of the instrument, is readily visible at a remote point. The cover 100 for the front of the instrument is omitted in Fig. 1. As shown most clearly in Fig. 1, pointer 5 is secured to and rotatable with the member 6 which is journaled in the arm 7 supported by bracket 8 from the plate 9. The rods 10—10 which extend through the member 6 serve normally to connect it with the shaft 11 as well as to form part of a clamping structure which also includes a plate 15.

The outer ends of the rods 10 are secured to the disk 13 which can be pulled outwardly by knob 13a to withdraw the rods 10 from the recesses 12 of shaft 11 against the compression of the spring 14 which presses the plate 15 against the stop pins 16, or equivalent, which project from rods 10.

Figure 5:
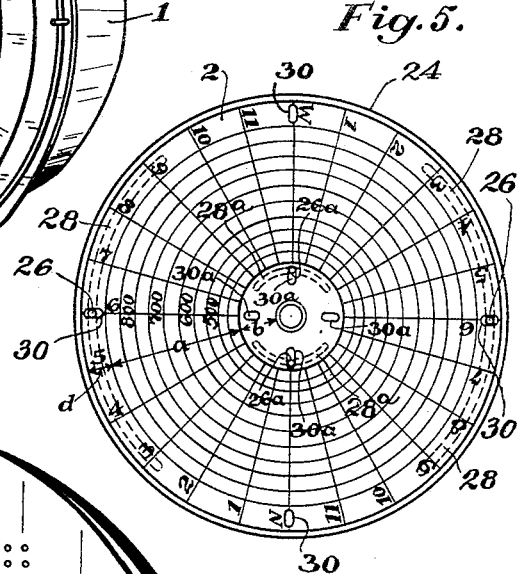
Fig. 5 is a front view of the recorder chart and driving disk.

The shaft 11 is received by the bearing 17 suitably secured to the plate 9. Bearing 17 also serves as a stub shaft for the gear 18 which is driven by motor 19 through gears (not shown), shaft 22 and pinion 23. Motor 19 may be a synchronous motor, an electric motor provided with a governor, a clock, or other constant speed device. To the hub of gear 18 is secured, as by pins 101, the driving disc 24 which forms a backing plate for the recorder sheet 2. The central portion of the sheet is lightly engaged between the disc 24 and the edge of the cup-shaped plate 15. The spider 25, which is loosely mounted on the hub of gear 18 and which has pins 26, 26a extending through arcuate slots 28, 28a of the driving disc 24, is biased by spring 29 to the position shown in Fig. 1 normally to maintain driving engagement between the spider 25 and disc 24 through friction elements 24a to effect rotation of the recorder sheet with respect to the path of the recorder pen 3. Pins 26 are 180° apart, and each 90° from pins 26a which are also 180° apart, as shown in Figs. 1a and 5.

To remove the recorder sheet, knob 13a, Fig. 1, is pulled outwardly to withdraw the clamping plate 15 and to pull the rods 10 out of the holes 12 so that the sheet can be slipped from pins 26 and 26a. A new sheet may then be inserted. After the sheet has been inserted between plate 15 and disc 24, it may be rotated independently of the driving disc 24 until the time chart of the sheet is in proper position. This is made possible by providing the sheet with two pairs of holes 30 and two pairs of holes 30a, the driving disc 24 with slots 28, 28a somewhat greater than 90° in extent, and by having the spider 25 resiliently mounted so that it can be pushed inwardly to withdraw pins 26, 26a from one set of holes 30, 30a and so permit adjustment of the chart until the other set of holes 30, 30a is in position to receive the pins.

The holes 30, 30a are radial slots rather than circular openings to allow for expansion and contraction of the recorder sheet with changes of temperature and humidity.

The recorder pen, as shown most clearly in Fig. 3, consists of a tube 31 of glass, or like material, having an open top 32 to receive ink, and a capillary tube 33 arranged within tube 31 so that its lower end extends a substantial distance from the top of the tube and whose upper end is bent so that the tip 34 is substantially normal to the plane of the record sheet. The pen is supported by a carriage 35 which is provided with clips 35a engaging and slidable along the rod 36 parallel to disc 24. The pen is moved to position simply by lowering it in the aperture 35b of the carriage 35 and sliding it between the spring fingers 37 until the tip 34 of the capillary tube bottoms in the notch 38. The carriage is driven by a violin string 39, or equivalent flexible element, which passes over the idler pulley 40 in recess 8a of bracket 8 (Fig. 1c), and the driving pulley 41 which is secured to the hub 6 of the pointer, index, or indicator 5. Both ends of the string are anchored to the driving pulley to prevent slippage and so ensure that the position of the pen shall, at all times, maintain a predetermined relation to the angular position of shaft 11.

Accordingly, as the shaft 11 is moved in one direction or the other in accordance with the changes of magnitude of a condition being measured, the recorder pen is moved radially of the continuously rotating recorder sheet and the pointer 5 simultaneously moves with respect to scale 4.

By the construction shown, it is possible to record the changes in magnitude of the condition and simultaneously to obtain an indication which is visible at a substantial distance from the instrument. The scale of the indicator is many times greater in length than the length of the recorder scale; the latter is substantially less than half the diameter of the record sheet, while the length of the former is of the order of the circumference of the recorder sheet. For example, in the instrument shown, the radial scale of temperature, or other condition, is 3½ inches, whereas, the indicator scale is 30 inches long. The indicator or pointer is 10 inches long, and so comprises a bold moving index cooperating with the large scale. The drive to the indicator is direct, insuring higher accuracy of the indications than with the ordinary indirect drive of the prior art.

Accurate readability at a substantial distance from the instrument is also enhanced by notching the inner periphery of the annular scale 4 to form the graduations instead of marking the scale in the usual manner. The indicator or index 5 may be mounted in the same plane as the scale 4, as shown in Fig. 1, thus avoiding any effects of parallax.

As shown in Figs. 1, 7 and 8, there is secured to the rear of the scale 4 an annular plate 4a which is unnotched so that a contrasting color on the front of plate 4a is visible through the notches N. In most cases, the dials for instruments of this character must be calibrated for the particular installation, and heretofore the scales have been laid out by a draftsman. The scale shown in Fig. 7, preferably of metal, can be made in a notching press in a much shorter space of time and is more easily readable at a distance. Furthermore, simultaneously with punching of the major graduations of the scale, the plate may be perforated, as at 42, to receive the pins 43 projecting from the back of numeral blocks 44.

The shaft 11 is connected to be driven by any suitable precision measuring or recording mechanism responsive to changes in magnitude of a condition to be measured. Specifically, such a precision mechanism may be of the type illustrated and described in Leeds Patent No. 1,125,699 or in Squibb Patent No. 1,935,732. Such a mechanism is preferably driven by the motor 19 through a shaft 51 corresponding, respectively, to the motor M and shaft 1 of the Squibb patent in which the shaft 10 corresponds to the shaft 46 of Fig. 1 which is the driving element of my improved indicator-recorder. In any event, the connection from the driving shaft 46 of the recorder mechanism to the shaft 11 of the indicator-recorder preferably includes cooperating disengageable elements. For example, the shaft 46 may be slotted to receive a pin 47 of a universal joint whose other pin 48 is received by a slot 49 in a disk 50 secured to the end of the shaft 11. The housing 45 is supported by the arm 63 pivoted concentrically with the axis of the driving shaft 64 of motor 19. By unloosening screw 65, the housing 45 may be swung about the axis of the shaft of motor 19 to withdraw the shaft 46 from the universal joint connecting it to shaft 11 of the indicator recorder.

In the modification shown in Figs. 9 to 12, the recorder sheet, upon the continuous revolving disk 24, is visible through the aperture in an annular scale 4a, as in the prior modification, and the bold index or pointer 5a is in front of the recorder sheet. In this modification, the pointer is secured as by brackets 70, 71 to a ring 72 which is supported at its rim, concentric with the axis of rotation of the recorder sheet, by the grooved rollers 73 which revolve in bearing members 74 secured to the inside of the cover plate 75. With the cover plate in position, the rear face of ring 72 frictionally engages the driving disc 76 which is secured to shaft 46' of galvanometer controlled mechanism 45 similar to that of the aforesaid patents to Leeds and Squibb, so that index 5a is rotated in one direction or the other depending upon the sense or direction of the change of the condition, as temperature, under measurement. In this modification, the slide wire Sa for rebalancing the measuring circuit including the galvanometer (not shown) of mechanism 45 is carried by a ring 77 secured to the cover 75, or as specifically shown, to the rear face of the scale 4a. The slide wire contact Sc is carried by part of the movable assembly consisting of the disk 72 and index 5a, so that it remains in a fixed position with respect to the index 5a. Because of this relation, the position of the pointer 5a always corresponds to the position for balance of the slide wire, notwithstanding any lost motion that may exist between the pointer 5a and its actuating mechanism.

The recorder pen carriage 35a is guided by the bar 36a secured to and extending radially of the cover 75 or equivalent. The driving cord 39a therefor passes around the idler pulley 40a pivotally mounted upon the guide 36a and around the pulley 41a secured to shaft 78 extending from the rear of index 5a in the axis of rotation of the recorder sheet. Accordingly, as the pointer moves in one direction or the other, the pulley 41a rotates therewith to change the position of the recorder pen which traces a record of the changes upon the sheet.

For clarity of showing, in Fig. 10, the scale, slide wire, the cover window 79, etc., have been omitted. It is to be noted that the slide wire, the scale, the index, the index supporting ring 72, the recorder pen, etc., constitute a unit assembly with the cover 75. Access for removing or replacing the recorder sheet is afforded by removal of the cover, and upon its return to position, all of the indicating and recording mechanism is brought again into operative relation with the driving disk 76.

An important feature of the modification is that the device may readily be adapted for a wide variety of uses, i. e., to adapt the instrument for a specific purpose, the only change necessary is to use a front assembly having the proper scale and slide wire.

The modification shown in Fig. 13 and 14 is generally similar to the preceding modification in that the slide wire, index, recording pen, etc., constitute a unit which is interchangeable with similar units having different scales and/or slide wires to allow the same basic driving unit to be used for different purposes. It differs therefrom in that the pointer 5b does not extend entirely across the space defined by the inner periphery of the scale, although it is still of such size and disposition to facilitate reading of the scale at a substantial distance from the instrument. As indicated, the supporting ring 72a for the index may be positively driven by providing it with gear teeth which mesh with teeth of the driving gear 76a. The recorder carriage 35b is guided by the rod 36b and threadably engages the threaded shaft 80 whose lower end is freely rotatable in the bearing 81 and to which is secured the bevel gear 82 meshing with the gear teeth of the ring 72a. The operation of the indicating and recording mechanism is similar to that of the preceding modification. In brief, when cover 75b is in position, the teeth of ring 72a are in mesh with gear 76a so that upon a change in the condition under measurement, the angular displacement of shaft 46' is communicated to ring 72a to change the position of index 5b with respect to scale 4b, to change the position of contact 5c along slide wire 5b, and to move the recorder pen or marker 31b with respect to the recorder sheet on disc 24.

While I have illustrated preferred arrangements, it is to be understood that my invention is not limited thereto but is co-extensive in scope with the appended claims.

What I claim is:

1. A recorder comprising a plate having arcuate slots and driven from a constant speed device, a chart-driving member having pins extending through said arcuate slots of said plate for reception by radial slots of a chart, and means for effecting a disengageable driving engagement between said plate and said member, said arcuate slots permitting angular adjustment of the chart with respect to said plate while said plate and said member are disengaged.

2. A recorder comprising a constant speed driving mechanism, a chart support directly connected to and positively driven by said constant speed driving mechanism, a chart driving member, a disengageable clutch adjustably interconnecting said chart support and said member, and resilient means normally effecting engagement therebetween.

3. An instrument comprising a mark exhibiting means, a support therefor, a rigid arm supported adjacent the edge of said means and extending in front thereof and at least to its center, means loosely mounted on said arm and bodily movable with respect thereto into and out of pressing engagement with said exhibiting means, and an element cooperatively associated with said exhibiting means and supported on said arm for movement with respect to said mark-exhibiting means.

4. An instrument comprising a support, an arm mounted on said support in spaced relation therewith, exhibiting means including a chart, a support therefor, and at least one movable element supported on said arm, a rotatable member carried by said arm, motion-transmitting means including said member for driving said element, and structure loosely mounted on said arm and bodily movable from a position in spaced relation with said chart into and out of engagement therewith to press said chart against its support.

5. An instrument comprising a markable element, a rigid arm supported adjacent the edge thereof and extending in front thereof at least to its center, a marker carried by said arm, a movable member connected to said marker, means supported on said arm and rotatably carrying said member for movement about said center, a driving member, and structure loosely mounted on said arm and bodily movable from a position in spaced relation with said markable element into contact therewith adjacent its center to press said markable element against said driving member.

6. An instrument comprising a support, an arm mounted on said support in spaced relation therewith, exhibiting structure including at least two movable elements, one of which is slidably supported on said arm, a rotatable member carried by said arm, motion-transmitting means mechanically connected to said member for rotating said member and for displacing said element across said arm, and structure bodily movable through said member into and out of pressing engagement with the other of said two movable elements.

7. An instrument comprising a driving member for a circular markable element, an arm supported adjacent the outer edge of said element and extending in front thereof at least to its center, a marker slidably supported on said arm for radial movement across substantially half of the markable element, at least two pulleys spaced one from the other, one of which is supported on said arm, and the other of which is supported substantially coplanar therewith, a belt carried by said pulleys for displacing said marker across said element, and structure movable axially of one of said pulleys for pressing the markable element against said driving member.

8. An instrument comprising a circular scale, an arm extending from the geometric center of said scale towards the periphery thereof, structure rotatably supported by said arm in concentric relation with said scale, one portion of said structure being disposed on one side of said arm and another portion on the opposite side thereof, rotatable means concentric with said scale and spaced therefrom, a member carried by said structure and movable relatively thereto into and out of driving engagement with said rotatable means, and an element driven by said structure and supported on said arm for relative movement with respect to said scale.

9. An instrument comprising a circular scale, an arm extending from the geometric center of said scale towards the periphery thereof, structure rotatably supported by said arm in concentric relation with said scale, one portion of said structure being disposed on one side of said arm and another portion on the opposite side thereof, rotatable means concentric with said scale and spaced therefrom, a member carried by said structure and movable relatively thereto into and out of driving engagement with said rotatable means, an element slidably supported on said arm, means for displacing said element across said scale in accordance with rotation of said structure, and precision means for driving said rotatable means in accordance with changes in the magnitude of a condition.

10. An exhibiting instrument comprising a markable element, a driving member therefor, a guiding member in front of said markable element, a marker slidably mounted on said guiding member for movement across said element, a movable member supported on said guiding member centrally of said markable element, and means supported by said guiding member and including structure bodily movable relative to said guiding member and said movable member to press said markable element against said driving member.

11. An exhibiting instrument comprising a markable element, a driving member therefor, a guiding member in front of said markable element, a marker slidably mounted on said guiding member for movement across said element, a pulley supported on said guiding member with its axis coinciding with the geometrical center of said markable element, means bodily movable with respect to said pulley into a position to press said markable element adjacent its geometrical center against said driving member, at least one additional pulley supported in spaced relation with said first-named pulley, and a driving belt supported on said pulleys for displacing said marker across said markable element.

12. An instrument comprising a shaft rotatable in opposite directions and to different extents in accordance with the direction and extent of change of the magnitude of a condition, exhibiting means including a movable element, an arm movably supporting said element in spaced relation with said shaft, and means loosely carried by said arm and bodily movable into and out of driving engagement with said shaft for driving said element.

13. An exhibiting instrument having a chart-support, an arm supported beyond the edge thereof, and extending in front of the chart-support, a pulley journaled on said arm substantially at the center of said chart-support, an additional pulley supported adjacent said arm at a point beyond the edge of said chart-support, a belt carried by said pulleys, a marker slidably supported on said arm and driven by said belt, and means movable axially of said first-named pulley into and out of pressing engagement with said chart-support.

14. An exhibiting instrument comprising a constant speed driving mechanism, a scale-support, directly connected to and positively driven by said driving mechanism, a scale driving member, a disengageable clutch interconnecting said scale-support and said member, said clutch when disengaged providing for relative movement between said scale-support and said member, and resilient means normally effecting engagement therebetween.

15. An exhibiting instrument comprising a constant speed driving mechanism, a scale, a scale-support directly connected to and positively driven by said constant speed mechanism, said support being provided with arcuate slots, a scale driving member having projections extending through said slots into driving engagement with said scale, friction elements supported on said scale-support and said member and normally forming a driving connection therebetween, and resilient means biasing said member towards said scale-support, said member being movable to disengage said friction elements and to rotate said scale relative to its support.

IRVING M. STEIN.